INVENTORS.
GARY R. ARGUE
BOONE B. OWENS
BY Henry Kolin
ATTORNEY

United States Patent Office 3,701,686
Patented Oct. 31, 1972

3,701,686
SOLID STATE CELL CONSTRUCTION
Gary R. Argue, Woodland Hills, and Boone B. Owens, Calabasas, Calif., assignors to North American Rockwell Corporation
Continuation-in-part of application Ser. No. 526,842, Feb. 11, 1966. This application Aug. 1, 1966, Ser. No. 573,744
Int. Cl. H01m 21/00
U.S. Cl. 136—83          5 Claims

ABSTRACT OF THE DISCLOSURE

A solid state electric cell having a solid electrolyte disposed between an anode and a cathode, and wherein solid electrolyte material is dispersed in at least the anode, and preferably in both the anode and the cathode. Preferably the dispersed electrolyte material is of substantially the same composition as the material of the solid state electrolyte.

This application is a continuation-in-part of application Ser. No. 526,842 filed Feb. 11, 1966 now abandoned.

This invention relates to solid state electric cells. More particularly it relates to solid state cells utilizing composite electrodes to provide enhanced conductivity therein.

Solid state cells and the batteries formed from assemblages of such cells have been known for several years. See U.S. Pats. 2,718,539 and Re. 24,408. Such cells offer the advantageous features of lightness in weight, long shelf life, absence of electrolyte leakage, and ready miniaturization. However, it has been recognized that the functional characteristics of the solid state cell depend to a marked extent on the ionic conductivity of the solid electrolyte used therein. See U.S. Pat. 2,930,830. Silver halides have been principally used for the electrolyte in these solid state cells in the past, but the resultant cells have relatively high values of internal resistance even where the electrolyte is present as a thin film of only several microns thickness. $Ag_3SI$, more recently, has been known as a suitable ionic conductor.

Solid conductive compositions of matter having particularly unusually high ionic conductivity have been described and claimed in our copending application Ser. No. 569,193 "Solid Ionic Conductors" filed Aug. 1, 1966 since abandoned in favor of continuing application Ser. No. 817,299, filed Apr. 17, 1969, which issued as U.S. Pat. 3,519,404, and novel electric cells utilizing such ionic conducting compositions of matter for the solid electrolyte therein have been described and claimed in our copending application Ser. No. 573,743 "Solid State Electrochemical Devices" filed Aug. 1, 1966 since issued as U.S. Pat. 3,433,997, both applications being assigned to the assignee of the present invention. However, it is highly desirable to achieve further increases in cell conductivity in order to obtain greater current capabilities from these cells.

Accordingly, it is an object of the present invention to provide a cell construction which will provide enhanced electrical conductivity for electric cells employing solid state electrolytes.

It is a further object to provide a solid state cell of still further enhanced electrical conductivity particularly where utilized with electric cells using preferred solid electrolytes of unusually high ionic conductivity.

In accordance with this invention, there is provided an improved solid state electric cell having an anode, a cathode, and a solid electrolyte disposed therebetween wherein at least said anode is modified to include a fine dispersion of electrolyte material therein. It is particularly preferred that both the anode and cathode be modified to contain dispersed electrolyte material, and preferably this dispersed electrolyte material is of the same composition as that used for the solid electrolyte of the cell. It is also generally preferred that the modified electrodes be composite ones wherein a layer of an electronically conductive material is overlaid with a layer of electrode material containing electrolyte material dispersed therein, this latter mixed layer being in direct contact with the electrolyte layer.

Other and further objects, advantages and features of this invention will become more apparent by reference to the drawing in which.

Figure 1:
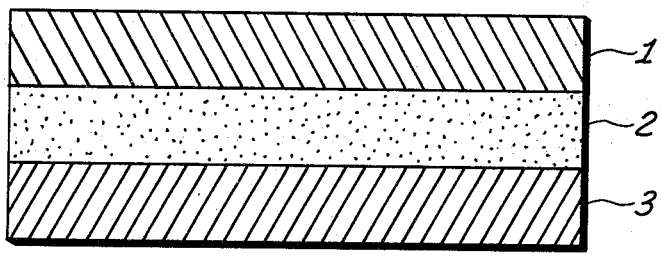
FIG. 1 is a cross sectional view of a conventional solid state electric cell construction as known to the art.

Referring to FIG. 1, which represents an idealized embodiment of a solid state electric cell construction as known to the art, there is shown an anode 1, which may consist of any suitable electron donor material; a cathode 2, which may consist of any suitable non-metallic electron acceptor; and disposed between the electrodes is a solid state electrolyte, heretofore the silver halides. Electrical leads and contacts, not shown, may be conveniently attached to the electrodes. Such a cell is schematically shown, for example, in U.S. Pat. 2,696,513. In U.S. Pat. 2,690,465 is shown a further example of a solid state cell consisting of $Ag/AgI/I_2$, the iodine generally being provided as an intimate mixture of carbon and iodine. More recently, Takahashi and Yamamoto have reported in the Journal of the Electrochemical Society of Japan, vol. 32, pp. 664–7 (1964), a solid state cell using $Ag_3SI$ as an improved solid state electrolyte. In our copending application Ser. No. 573,743 "Solid State Electrochemical Devices" filed Aug. 1, 1966, we have described and claimed a solid state cell using as solid state electrolyte a particularly suitable and preferred conductive composition of matter.

Figure 2:
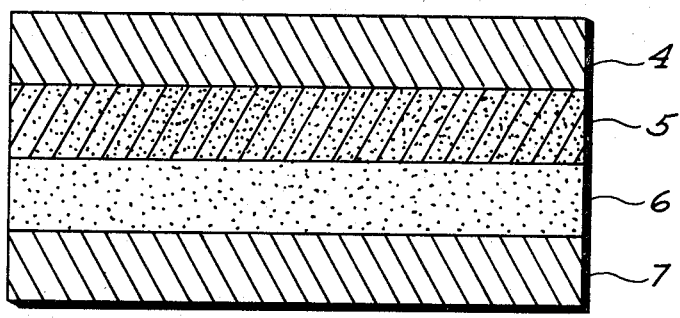
FIG. 2 is a cross sectional view of one embodiment of the cell of the present invention.

Referring to FIG. 2, there is shown a preferred embodiment of a cell construction of this invention in which a composite anode consists of an anode layer 4 of an electronically conductive layer, e.g., silver or tantalum, and an overlying mixed anode layer 5 consisting of the anode material with solid state electrolyte material dispersed therein, and which optionally and preferably includes carbon. The solid state electrolyte layer 6, which is in contact with the mixed anode layer 5, may comprise any of the known solid state electrolyte materials as well as those ionically conductive materials described and claimed in the copending application S.N. 569,193, "Solid Ionic Conductors."

It has been found that still further and particularly high cell conductivity results are obtained in the practice of this invention where the solid electrolyte 6 has an initially high ionic conductivity. Thus preferred materials for the solid electrolyte 6 in the practice of this invention will be the conductive compositions disclosed and claimed in the aforesaid copending application S.N. 569,193, wherein the solid electrolyte comprises an ionically conductive composition of matter wherein the conductivity-imparting component has the formula $Mag_4I_5$, M being selected from the class consisting of K, Rb, $NH_4$, Cs and combinations thereof, Cs being present only as a minor constituent of M, i.e., less than 50 ion percent of M. Although the most marked improvement in cell conductivity is obtained where the solid eelctrolyte is also highly ionically conductive, improvements in cell conductivity will also be obtained where the solid electrolyte consists of materials of lower conductivity such as the silver halides.

Figure 3:
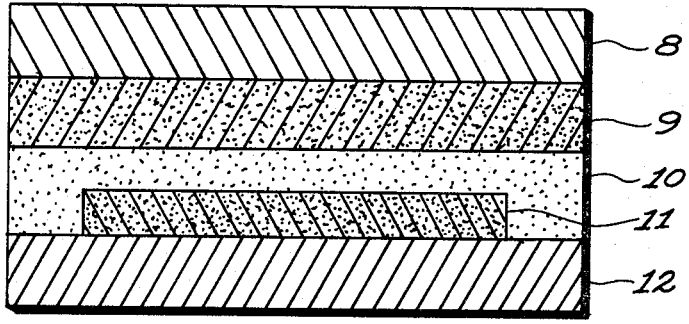
FIG. 3 is a cross sectional view of a second embodiment of the cell of this invention.

The most advantageous results in the practice of this invention are obtained when both the anode and cathode are of composite structure and contain dispersed solid electrolyte therein, as shown in FIG. 3. Where only a single composite electrode is used, the performance of the cell will be improved by making either electrode a composite one in accordance with the practice of this invention. The dispersed electrolyte preferably should be nonreactive with the materials used for cathode and anode.

Referring to FIG. 3, another embodiment of a solid state electric cell construction is shown in which both the anode and cathode contain dispersed electrolyte and in which an electronically conductive material overlays the composite cathode layer and is in contact with the cathode but not coextensive therewith. The anode is a composite anode consisting of a layer 8 of an electronically conductive material overlaid by a mixed layer 9 of anode material with solid state electrolyte dispersed therein. The solid electrolyte layer 10 is in contact with that portion of the composite anode which contains dispersed solid electrolyte. The composite cathode is shown as a layer 11 of electron acceptor cathode material which contains electrolyte material dispersed therein. The overlying layer 12 is an electronically conductive layer. In one respect, layers 11 and 12 function cooperatively as a composite cathode. Where the cathode material consists of iodine dispersed in carbon and further containing dispersed solid electrolyte, it is preferred that layer 12 while in contact with layer 11 not be coextensive therewith. Thereby, possible short circuiting of cell elements is prevented and iodine is more readily retained in the cathode matrix. Conductive layer 12 should be nonreactive with the electron acceptor material. Conveniently, tantalum or carbon may be used where iodine comprises the cathode material.

The physical and chemical mechanism accounting for the unexpectedly improved results obtained in the practice of this invention is a complex one and is not fully understood. Thus, when only a single electrode has electrolyte material incorporated therein, at least a two-fold improvement in cell conductivity is obtained. However, by incorporating electrolyte material in the second electrode also, the overall improvement in cell conductivity becomes several hundred-fold with a cell using a high ionically conducting solid electrolyte.

The following is offered as a possible explanation of this surprising and unexpected increase in over-all cell conductivity, although it is not intended to limit the practice of the present invention. Analytically, it is assumed that the over-all internal resistance of the solid state electric cell is effectively determined as the sum of three idealized resistances: the resistance of the solid electrolyte, which is a function of the nature of the material and the thickness of the layer disposed between the electrodes; the interface resistance at the cathode-electrolyte interface; and the interface resistance at the anode-electrolyte interface. Ordinarily, the cathode and anode are of high electronic conductivity and do not as such contribute substantially to the overall internal resistance of the cell. In addition to the limiting effect on the cell current that results because of the internal resistance of the cell, the phenomenon of cell polarization due to the effective surface area of the electrode becomes of importance in determining the current density that may be withdrawn from the cell as well as the actual amount of energy obtained from the cell compared with the theoretically available energy. This latter consideration is of importance in space applications where available energy per unit weight is a significant consideration.

In U.S. Pat. 2,718,539 there are shown novel solid state cell in which a "positive depolarizer electrode" consists of a conventional depolarizing material in mixture with respect to the marked improvement in cell conducsalts are also acting as solid state electrolytes in the cell.

The purpose of including electrolyte with the depolarizing material is not stated, and the cells themselves give currents of the order of 0.1 microampere.

We have found in practicing the present invention that including electrolyte material in the cathode and in the anode in intimate admixture apparently results in a marked increase in available surface area occurring at the cathode-electrolyte interface and the anode-electrolyte interface. Consequently, many more paths are available for the transport of current in the cell. Thereby, the interface resistance is considerably reduced, and, with both the cathode and anode interface resistances so reduced, the internal resistance of the cell becomes essentially that of the solid electrolyte. Thus, where the solid electrolyte is a highly conductive one such as $Ag_3SI$ and particularly one including $MAg_4I_5$ where M is selected from K, Rb, $NH_4$, Cs, and combinations thereof, Cs being present only as a minor constituent of M, solid state cells capable of carrying high currents are now available for the first time. In addition to the reduction of interface resistance at the electrolyte-electrode interface, an associated phenomenon appears present and of increasing importance where the solid electrolyte is one of high ionic conductivity. For example, a typical cell using the construction of the prior art as shown in FIG. 1, but differing from known cells in utilizing a high conductivity electrolyte, may be represented as $Ag/RbAg_4I_5/I_2+C$. Such a cell is disclosed and claimed in copending application S.N. 573,743. The cathode reaction may be written as $\frac{1}{2}I_2+Ag^++e \rightarrow AgI$, the iodine accepting an electron. The anode reaction may be written as $Ag \rightarrow Ag^++e$, an electron being donated.

Where no electrolyte is present in the cathode, there is a gradual build-up of the relatively high resistance AgI compared with the relatively high conductivity $RbAg_4I_5$. Thus the limiting factor in the transport of cell current becomes the resistance of the cathode at its interface with the electrolyte rather than the ionic conductivity of the electrolyte. Conventional polarization phenomena are not considered as significant in limiting the current in that the iodine has a high vapor pressure and is relatively free to move in the conductive carbon lattice and thereby unite with silver ions as they are made available at the cathode surface.

However, with respect to the anode, another related phenomenon of maximum utilization of electrode material becomes significant. Thus the anode is usually in the form of a sheet or film of the conductive material such as silver. The silver available at the interface with the electrolyte becomes ionized, liberates electrons, and is very rapidly depleted. Because of its low vapor pressure there are no other silver atoms available to replace those depleted at the surface. Thus but a small amount of the total silver will be utilized for electric energy before the silver present in the surface is depleted. However, by replacing the foil or sheet of silver with a composite anode which includes a layer of finely divided silver powder intermixed with electrolyte, in addition to the surface area being markedly increased, the silver is now readily available at the silver-electrolyte interface. Thereby, not only is a greater current flow possible but also there will be a greater actual utilization of the theoretical energy available from the amount of silver present. Ordinarily the iodine in the cathode will, even in the absence of electrolyte, be almost 90 percent depleted, depending upon the rate of current flow.

It is recognized, of course, that the foregoing explanation may not fully account for the phenomena observed with the use of a high conductivity solid electrolyte, it is tivity, and that this discussion is based on the assumption of a theoretical idealized model. However, in conjunction with a magnesium salt or potassium salt, where these now feasible, by incorporating electrolyte in both the cathode and anode, to provide a solid state cell whose internal resistance is essentially limited only by that of the high conductivity electrolyte. Heretofore, elimination of interface resistivities of the same order of magnitude as that of a high resistivity solid ion electrolyte could only result in a relatively small gain in over-all cell conductivity. But with the present invention, currents of the order of hundreds of milliamperes/cm.$^2$ are available compared with the microampere currents obtained from solid state cells heretofore known. The following examples, which are not to be construed as limiting the practice of this invention, are illustrative of some of the improvements that may be obtained. It should be noted that the ionically conductive composition of matter having the empirical formula $MAg_3I_4$ is actually a multiphase mixture of the high conductivity compound $MAg_4I_5$ and of a high resistivity component which may include $M_2AgI_3$ and MI, where M is a univalent ion selected from the class consisting of K, Rb, $NH_4$, Cs, and combinations thereof, Cs being present only as a minor constituent of M, i.e., less than 50 ion percent of M. The mixture [$MAg_3I_4$] contains about 85 mole percent of $MAg_4I_5$ and has an ionic conductivity only slightly less than that of $MAg_4I_5$. The empirical formula $MAg_3I_4$ is enclosed in brackets to show that this composition of matter is not a single-phase compound. However, such a mixture may be more convenient to prepare and thus may be used in place of the single-phase compound.

EXAMPLE 1

Solid state cell with $Ag_3SI$ as electrolyte layer

A cell was made in accordance with this invention and compared with a reported prior art solid state cell using $Ag_3SI$ as the electrolyte. This prior art cell consisted essentially of the system $Ag/Ag_3SI/I_2+C$. The cell contained a pressed pellet of a carbon-iodine mixture as cathode, a pressed wafer of $Ag_3SI$ having a thickness of 0.15 cm. as electrolyte and a silver foil as the anode. A silver wire was used as reference electrode, and it was found that the silver anode electrode was badly polarized at a current density of about 500 microamp/cm.$^2$. About a two- to three-fold improvement was effected in the silver electrode polarization by amalgamating the silver foil. Flash currents of 10 ma./cm.$^2$ were observed using the amalgamated silver foil in the best cells obtained.

By the practice of the present invention, utilizing a cell containing a composite anode and a composite cathode, e.g., the system $$Ag+[RbAg_4I_5]/Ag_3SI/I_2+C+[RbAg_4I_5]$$

cells were prepared which provided flash currents of 25 ma./cm.$^2$. These cells provided a steady-state current of 5 ma./cm.$^2$ compared with the 0.5 ma./cm.$^2$ of the prior art cell. A battery was assembled consisting of three 1-inch diameter cells having composite anodes in accordance with this invention. These cells were connected in series and delivered about 2.0 v. and 5 ma./cm.$^2$. This battery was used to power a commercial transistor radio drawing 25 ma. at 1.5 v.

EXAMPLE 2

[$KAg_3I_4$] cell

Similarly, cells were prepared having an $$Ag/[KAg_3I_4]/C+I_2+[KAg_3I_4]$$

structure. These delivered a current of approximately 20 ma./cm.$^2$. By contrast, when some [$KAg_3I_4$] was also mixed with powdered silver to form to composite anode, the current density increased to approximately 300 ma./cm.$^2$, more than a 10-fold increase.

EXAMPLE 3

Improvement by use of cell with composite electrodes

The following cells were prepared using both individual and composite anodes and cathodes and were found to have the following characteristics:

| Anode | Electrolyte | Cathode | Int. res. (ohms) | Flash current (ma./cm$^2$.) |
|---|---|---|---|---|
| 0.7 gm. Ag | 3 gm. [RbAg$_3$I$_4$] | 0.5 gm. I$_2$, 0.5 gm. C | 60 | 3 |
| 0.7 gm. Ag | 3 gm. [RbAg$_3$I$_4$] | 2.5 gm. [RbAg$_3$I$_4$], 0.5 gm. I$_2$; 0.5 gm. C | 10 | 16 |
| 0.7 gm. Ag, 0.35 gm. [RbAg$_3$I$_4$] | 3 gm. [RbAg$_3$I$_4$] | 0.5 gm. C, 0.5 gm. I$_2$ | 8 | 10 |
| 0.7 gm. Ag, 0.35 gm. [RbAg$_3$I$_4$] | 3 gm. [RbAg$_3$I$_4$] | 2.5 gm. [RbAg$_3$I$_4$], 0.5 gm. I$_2$; 0.5 gm. C | .5 | 210 |
| 3.0 gm. Ag | 3 gm. RbAg$_4$I$_5$ | 3.0 gm. RbAg$_4$I$_5$, 0.5 gm. I$_2$; 0.5 gm. C | 12 | 10 |

As may be noted, upon incorporation of electrolyte in the anode and in the cathode, the internal resistance of the cell markedly decreased.

EXAMPLE 4

Improvement by use of electric cell with composite electrodes

The following electric cells were prepared essentially as shown for Example 3, using composite cathodes and with both individual and composite anodes, and were found to have the following characteristics:

| Cell No. | Anode comp. | Electrolyte | Cathode comp. | Int. res., ohms | Silver utilization, percent |
|---|---|---|---|---|---|
| 1 | 1 gm. Ag | 2 gm. [RbAg$_3$I$_4$] | .5 gm. I$_2$, 1 gm. C, .5 gm. [RbAg$_3$I$_4$] | 1.1 | 12 |
| 2 | 1 gm. [RbAg$_3$I$_4$], .5 gm. Ag, .1 gm. C | 3 gm. [RbAg$_3$I$_4$] | .5 gm. I$_2$, 1 gm. C, 3.0 gm. [RbAg$_3$I$_4$] | .2 | 70 |

As may be noted from a comparison of the two cells using [$RbAg_3I_4$] as electrolyte, upon incorporation of electrolyte also in the silver anode, the internal resistance of the cell is reduced markedly, in part by decreasing the anode-electrolyte contact resistance. However, more importantly, the utilization of silver is almost six-fold greater in the composite anode cell compared to the other type of cell.

It will of course be understood that many parameters may be varied in order to optimize the cell current. These include the silver-electrolyte ratio in the anode, the particle-size of electrode and electrolyte compositions, the pressure used in the molding of the electrodes, and other aspects of cell preparation. However, as the crux of the present invention, it has been found that, in all instances, incorporating the electrolyte in the anode, thereby presumably increasing its interface area and also preventing surface depletion of available silver atoms, effectively increases the current available from the cell. Further, where non-reactive electrolyte material is also present in the cathode, maximum improvement is obtained since effectively the internal cell resistance is only that of the solid electrolyte. Thus while we have explained the principle and preferred mode of operation of our invention, according to the patent statutes, and have illustrated and described what we now consider to represent its best embodiment, we desire to have it understood that within

We claim:

1. A self-contained solid state electric cell comprising an oxidizable solid anode material, a reducible solid cathode material, and an ionically conductive solid electrolyte disposed between said anode material and said cathode material, wherein the improvement comprises that at least said anode material includes dispersed therein an ionically conductive solid electrolyte material to provide an increase in electrical conductivity of said solid state electric cell, said ionically conductive solid electrolyte containing silver ions for conduction of current and the solid electrolyte material dispersed in at least said anode material containing silver ions.

2. A cell according to claim 1 wherein both said anode material and said cathode material include dispersed therein an ionically conductive solid electrolyte material to provide an increase in electrical conductivity of said solid state electric cell, the dispersed electrolyte material being of substantially the same composition as the material of said solid electrolyte.

3. A cell according to claim 1 wherein the solid electrolyte disposed between the anode material and cathode material comprises $Ag_3SI$.

4. A cell according to claim 3 wherein said anode material comprises an intimate mixture of silver and an electrolyte material having the empirical formula $RbAg_3I_4$.

5. A cell according to claim 4 wherein said cathode material comprises a mixture of carbon, iodine and composition having the empirical formula $RbAg_3I_4$.

References Cited

UNITED STATES PATENTS

| | | | |
|---|---|---|---|
| 2,276,188 | 3/1942 | Greger | 136—86 |
| 3,117,035 | 1/1964 | Mrgudich | 136—153 |
| 3,160,527 | 12/1964 | Hess | 136—86 |
| 3,268,365 | 8/1966 | McQuade et al. | 136—120 |
| 3,170,817 | 2/1965 | Mrgudich | 136—83 |
| 3,317,351 | 5/1967 | Honeycutt et al. | 136—83 |
| 3,379,569 | 4/1968 | Berger et al. | 136—6 |
| 3,266,940 | 8/1966 | Caesar | 136—153 |

ALLEN B. CURTIS, Primary Examiner

C. F. LE FEVOUR, Assistant Examiner

U.S. Cl. X.R.

136—153

PO-1050
(5/69)

UNITED STATES PATENT OFFICE
CERTIFICATE OF CORRECTION

Patent No. 3,701,686      Dated October 31, 1972

Inventor(s) G. R. Argue et al

It is certified that error appears in the above-identified patent and that said Letters Patent are hereby corrected as shown below:

Column 2, line 65 "$Mag_4I_5$," should read --$MAg_4I_5$,--.
Column 3, line 72 "c ll" should read --cells--;
Column 3, line 73 "convetional" should read --conventional--;
Column 3, line 74 change this line to read: --with a magnesium salt or potassium salt, where these--.
Column 4, lines 68-71 change these lines to read: --with respect to the marked improvement in cell conductivity, and that this discussion is based on the assumption of a theoretical idealized model. However, in conjunction with the use of a high conductivity solid electrolyte, it is--.
Column 6, line 9 "to" (second instance) should read --the--.

Signed and sealed this 19th day of November 1974.

(SEAL)
Attest:

McCOY M. GIBSON JR.
Attesting Officer

C. MARSHALL DANN
Commissioner of Patents